United States Patent

[11] 3,545,816

| [72] | Inventor | Thomas H. Engle<br>Cape Vincent, New York |
|---|---|---|
| [21] | Appl. No. | 819,367 |
| [22] | Filed | April 25, 1969 |
| [45] | Patented | Dec. 8, 1970 |
| [73] | Assignee | General Signal Corporation<br>a corporation of New York |

[54] ELECTRICALLY ASSISTED AUTOMATIC AIR BRAKE FOR TRAINS
10 Claims, 1 Drawing Fig.

| [52] | U.S. Cl. | 303/15, 303/75 |
|---|---|---|
| [51] | Int. Cl. | B60t 7/00 |
| [50] | Field of Search | 303/8, 15, 75, 76, 20 |

[56] References Cited
UNITED STATES PATENTS

| 2,678,851 | 5/1954 | Laber | 303/15X |
|---|---|---|---|
| 2,841,447 | 7/1958 | Cotter | 303/15 |

Primary Examiner—Duane A. Reger
Attorney—Dodge & Ostmann

ABSTRACT: An electropneumatic train braking system employing a generally conventional automatic airbrake and an electrically operated airbrake-assisting scheme including a pair of solenoid valves on each car which control, respectively, a direct bleed from the brake pipe and the exhaust connection of the car's control valve. The electrical circuit includes a single trainlined control wire whose constituent portions are joined through the hose couplings of the trainlined brake pipe, and a return path consisting of the rails and metal portions of the cars. The control wire is energized by supply circuits associated with the brake valve, and its polarity governs which set of solenoid valves is actuated.

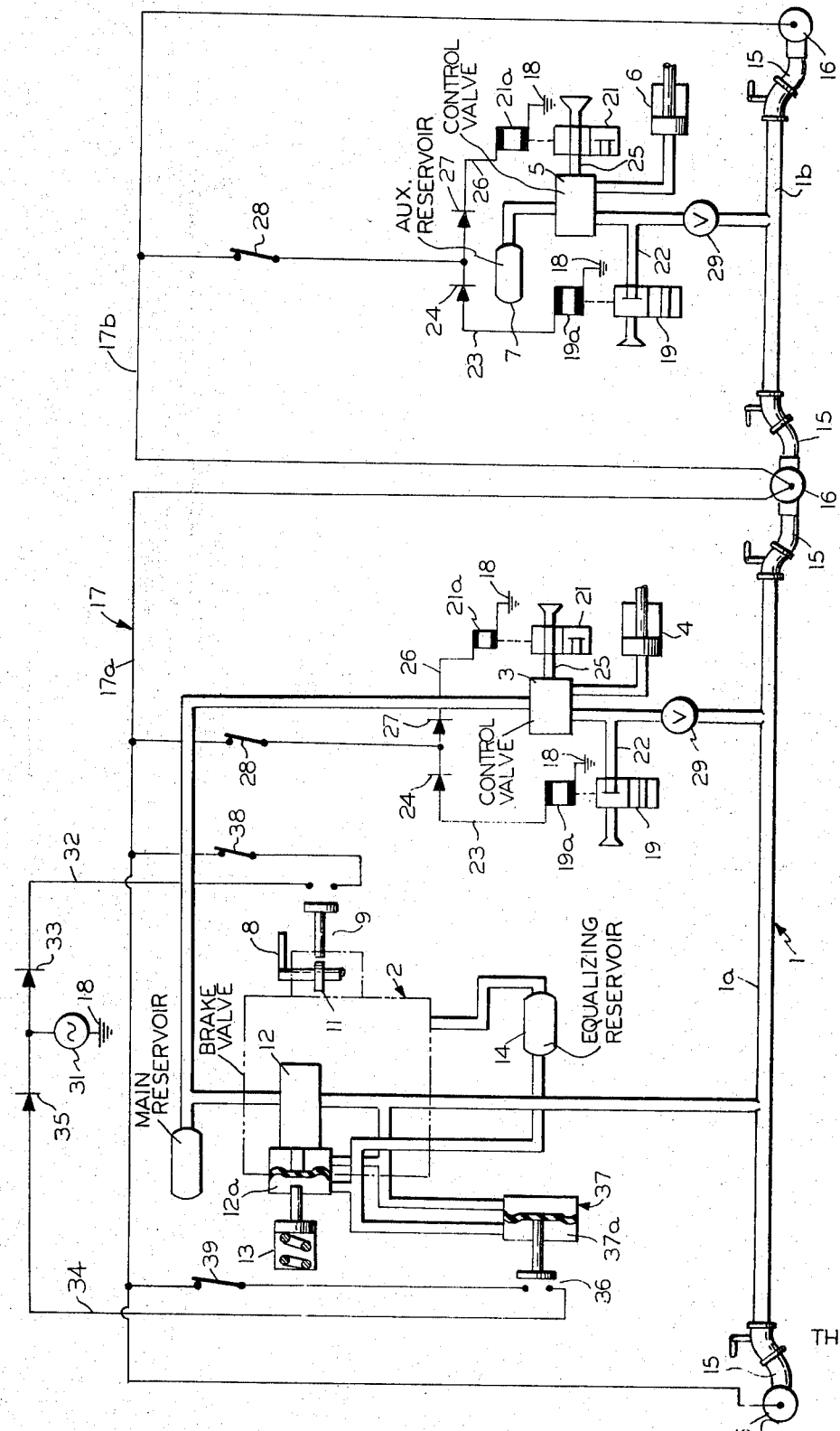

ELECTRICALLY ASSISTED AUTOMATIC AIR BRAKE FOR TRAINS

BACKGROUND AND SUMMARY OF THE INVENTION

For many years, the automatic airbrake has been the standard service brake employed by the railroad industry. Although this type of brake has proved satisfactory, it has certain undesirable characteristics. The chief disadvantage probably is slow response, but the inability to effect graduated releases, to simultaneously operate the brakes on all cars, and to charge the auxiliary reservoirs while the brakes are applied also impose limitations on train operation. It has long been recognized that braking performance could be improved by using an electrically operated circuit to assist the airbrake, but, as far as I am aware, no practical assisting scheme has been devised.

The object of this invention is to provide a practical electrically assisted airbrake which eliminates all of the disadvantages enumerated above. According to this invention, the electrical circuit employs a single trainlined control wire which preferably uses the gladhands or hose couplings of the brake pipe to interconnect its constituent portions, and which relies upon the metal rails, car bodies and couplers to provide a return path. Each car is equipped with holding and application devices which respond to the polarity of the control wire and serve, respectively, to either prevent release of brake cylinder pressure through the car's control valve or to open a direct bleed from the trainlined brake pipe. The control wire is selectively energized in one or the other sense by two supply circuits which, in the preferred embodiment, are associated with a slightly modified version of a conventional engineer's brake valve. The supply circuit which energizes the control wire in a sense that effects actuation of the application device is activated in response to development of a small differential between equalizing reservoir pressure and brake pipe pressure. Creation of such a differential is insured during any application by reason of the fact that the brake valve employs a relay valve which is designed to shift to exhaust position only after development of a larger differential. Since, with this scheme, brake pipe reductions are effected by bleeding air from the pipe at each car, the new system greatly increases the speed at which the reduction is propagated through the train and guarantees that the brakes on all cars will be applied substantially simultaneously. The other supply circuit effects energization of the holding device and is activated by a cam operated switch included in the brake valve. The switch is actuated when the brake valve is in a holding position which replaces the usual minimum reduction position and is the pneumatic equivalent of the release position. Therefore, use of the holding position permits charging of the auxiliary reservoirs without necessitating release of the brakes. Moreover, by keeping the valve in this position until the control valves in the train shift to release position and then cycling it back and forth between the release and holding positions, the engineer can effect a graduated, simultaneous release of all of the brakes in the train. And, this feature is afforded without impairing the ability to effect the usual serial release of the brakes which is realized when the brake valve is shifted directly from an application position to the release position.

BRIEF DESCRIPTION OF THE DRAWING

The preferred embodiment of the invention is described herein with reference to the accompanying drawing which is a schematic diagram of the system as applied to a train consisting of a locomotive and a single car.

DESCRIPTION OF THE PREFERRED EMBODIMENT

Referring to the drawing, the system comprises an automatic airbrake which includes a trainlined brake pipe 1, an engineer's brake valve 2, a conventional control valve 3 for controlling air flow to and from the locomotive brake cylinder 4, and a conventional control valve 5 on each car for controlling air flow into and out of the car's brake cylinder 6, auxiliary reservoir 7 and emergency reservoir (not shown). Brake valve 2 is a conventional Type 26 brake valve except for the following modifications:

a. the cams normally controlled by handle 8 are formed so that they dwell in release condition for the first 10° of handle movement, i.e., the usual minimum reduction position is converted to a holding position which is identical to the release position as far as the pneumatic components of the brake valve are concerned;

b. the valve is equipped with a switch 9 which is closed by an extra cam 11 when handle 8 is in holding position; and c. the relay valve 12 is provided with a biasing device 13 which prevents it from shifting from lap position to exhaust position until brake pipe pressure exceeds the pressure in equalizing reservoir 14 by more than a predetermined amount, for example 4 p.s.i., but has no effect upon the supply function of the relay valve.

As usual, the constituent portions 1a and 1b of brake pipe 1 are interconnected by rubber hoses 15 and metal couplings or "gladhands" 16. Since the couplings in this system also serve as electrical connectors hoses 15 must be nonconductive and the mating surfaces of the clamping lugs on the two coupling halves should be plated with a nonoxidizing material or one whose oxide is a good conductor. Nickel plating is recommended. These mating surfaces are forced together by the pressure within brake pipe 1, so electrical continuity through each coupling 16 is insured inherently while the train is in motion.

Superimposed on the air brake is an electrically operated brake-assisting circuit comprising a single trainlined control wire 17 whose constituent portions 17a and 17b are attached to, and thus joined through, the mating halves of the hose couplings 16, and a return conductor identified by ground symbol 18 and defined by the metal rails, car bodies and couplers. The conductors 17 and 18 serve to energize in a prescribed manner the operating solenoids 19a and 21a of a pair of valves 19 and 21, respectively, carried by each car and each locomotive in the system. Valve 19, which serves as an application valve, is interposed in an atmospheric vent connection 22 leading directly from brake pipe 1 and is normally closed. Its solenoid 19a is connected with the main conductors 17 and 18 through a branch conductor 23 containing a blocking diode 24 oriented to permit energization of solenoid 19a, and consequently opening of valve 19, only when trainlined wire 17 is negative relative to return conductor 18. Valve 19, or the vent connection 22, is choked so that when the valve opens air is exhausted from brake pipe 1 at a service rate. Valve 21, on the other hand, serves as a holding valve, and it is interposed in the atmospheric connection 25 through which control valve 3 or 5 vents brake cylinder 4 or 6 and is normally open. Its solenoid 21a is connected in a branch conductor 26 containing diode 27, so it is energized, and valve 21 is closed, only when trainlined wire 17 is positive with respect to return conductor 18. The two branch conductors 23 and 26 share a common conductor portion containing a switch 28 which performs the same cutout function with respect to the car's electrical circuits as cutout cock 29 performs for the pneumatic equipment.

The trainlined control wire 17 is energized, and its polarity is controlled, by a pair of supply circuits associated with brake valve 2 and connected between an AC source 31 on the locomotive and the control wire. The first circuit comprises a conductor 32 which is controlled by cam operated switch 9 and contains a blocking diode 33 oriented to permit current flow toward, but not away from, the control wire. Therefore, this supply circuit renders wire 17 positive with respect to return conductor 18 when brake valve is in holding position, and thereby effects closure of all the holding valves 21 in the train. The other supply circuit includes a conductor 34 containing a second blocking diode 35, oriented to permit current flow from wire 17, and is controlled by a differential pressure switch 36. The diaphragm operator 37 for switch 36 responds to differences between the pressures in brake pipe 1 and equalizing reservoir 14 and is arranged to close the switch whenever brake pipe pressure exceeds reservoir pressure by a small amount less than that required to shift relay valve 12 to exhaust position. Therefore, at the commencement of each brake application, this supply circuit renders control wire 17 negative with respect to return conductor 18, and thereby effects opening of all the application valves 19. Each supply circuit is provided with a cutout switch 38 or 39 which allows it to be isolated from the trainlined circuit.

During service, cutout cocks 29 will be open, cutout switches 28, 38 and 39 will be closed, and the system will operate as follows:

a. Running

With the handle 8 of brake valve 2 in release or running position, switch 9 will be open, and the regulator (not shown) in valve 2 will deliver air at a set pressure from the main reservoir to equalizing reservoir 14 and the diaphragm chambers 12a and 37a of relay valve 12 and operator 37, respectively. Inasmuch as regulator output pressure always equals or is greater than brake pipe pressure, diaphragm operator 37 will keep switch 36 open. Therefore, trainlined control wire 17 will be deenergized, and the application and holding valves 19 and 21, respectively, will assume their illustrated positions. As a result, the system will operate as a conventional automatic airbrake, i.e., relay valve 12 will charge brake pipe 1 to and maintain it at the pressure set by the regulator, control valves 3 and 5 will vent cylinders 4 and 6 and release the brakes, and the auxiliary reservoirs 7 will be charged.

b. Application

In order to apply the brakes, the engineer shifts handle 8 of valve 2 to a position within the application zone to thereby reduce the pressure in equalizing reservoir 14 and in the connected chambers 12a and 37a of the diaphragm operators for relay valve 12 and switch 36, respectively. As soon as a small differential is developed between the pressures in brake pipe 1 and reservoir 14, operator 37 will close switch 36 and cause control wire 17 to be energized on each negative half cycle of the AC power delivered by source 31. Therefore, solenoids 19a will now open the application valves 19 and allow air to bleed from brake pipe 1 at a service rate at each car in the train. When brake pipe pressure reduces to a level just slightly below the prevailing pressure in equalizing reservoir 14, operator 37 will reopen switch 36. This se action deenergizes control wire 17 and causes application valves 19 to close. The reduction in brake pipe pressure triggers the control valves 3 and 5 in the usual way and causes them to pressurize cylinders 4 and 6 and apply the brakes. As handle 8 is advanced through the application zone, the system progressively decreases brake pipe pressure in accordance with the commanded decreases in equalizing reservoir pressure, and thereby gradually increases braking effort.

Since operator 37 closes switch 36 at a very small differential between the brake pipe and equalizing reservoir pressures, and the application valves 19 effect a rapid decrease in brake pipe pressure, biasing device 13 will be effective to prevent relay valve 12 from shifting to exhaust position during brake applications. However, if, as a result of leakage, brake pipe pressure should decrease significantly below the level selected for an application, relay valve 12 will shift to charging position and perform its normal pressure-maintaining function.

c. Holding

If, after making an application, the engineer wishes to recharge the auxiliary reservoirs 7 without releasing the brakes, he shifts handle 8 to holding position. Pneumatically, this position is the same as release; therefore, brake valve 2 will now commence to recharge equalizing reservoir 14 and brake pipe 1. The resulting increase in brake pipe pressure causes control valves 3 and 5 to shift to release position and thus allows auxiliary reservoirs 7 to be replenished from brake pipe 1. Movement of handle 8 to holding position also causes cam 11 to close switch 9. Therefore, wire 17 is now energized on each positive half-cycle of the AC power, and solenoids 21a close the holding valves 21. This prevents the control valves 3 and 5 from venting the brake cylinders and insures that the brakes remain applied. Since, during the holding operation, brake pipe pressure necessarily does not exceed equalizing reservoir pressure, operator 37 maintains switch 36 open and guarantees that application valves 19 remain closed.

d. Graduated Release

In order to effect a simultaneous, graduated release of all brakes, the operator first shifts handle 8 to holding position and maintains it there long enough for control valves 3 and 5 to shift to release position, and then cycles it back and forth between the holding and release positions while observing the locomotive brake cylinder pressure gage. These manipulations of the handle 8 cause the holding valves 21 to cycle in unison between their open and closed positions, and, since each brake cylinder is in communication with the exhaust connection 25 through its control valve 3 or 5, the result is a stepwise reduction in braking effort. The holding valves 21 are calibrated so that they afford equal release times from equal pressures, and therefore a selected reduction in locomotive brake cylinder pressure (as observed on the gage) will be accompanied by a like reduction in the pressures in all of the other cylinders. Thus, simultaneous, graduated release of all brakes is provided.

e. Serial Release

In certain situations, for example starting a train on a grade, it is desirable to release the brakes in the normal, serial fashion. This mode of release is accomplished in the usual way by shifting handle 8 directly from the application to the release position since, in the last mentioned position, both of the switches 9 and 36 are open and the air brake operates as though the electrical assist circuit were not present.

f. Suppression and Handle Off

In both of these modes of operation the electrical assist circuit has no effect, so the new system performs exactly the same as a conventional automatic airbrake.

g. Emergency

During certain emergency conditions, such as train brake in two or operation of the caboose valve, the electrical assist circuit remains idle, and the system applies the brakes in the same way as a conventional automatic air brake. On the other hand, if an emergency application is effected by shifting handle 8 to emergency position, operator 37 will close switch 36 as soon as brake valve 2 commences to drain equalizing reservoir 14 and brake pipe 1. Consequently, all of the application valves 19 will open and immediately cause the emergency pistons in control valves 3 and 5 to shift to preliminary quick action position. The effect of this is to expedite transmission of the emergency brake pipe reduction through the train. In a conventional airbrake, it takes about eight seconds for quick action to propagate through the train and another eight seconds for brake cylinder pressure to build up to the commanded level. In contrast, the present system causes brake cylinder pressure to commence to rise almost immediately upon shifting of handle 8 to emergency position. Therefore, the braking effectiveness of this system during an engineer-commanded emergency application will be approximately twice that of the conventional system.

It should be noted that if, after making a service application and shifting the handle 8 to holding position, the engineer moves the handle again into the application zone to effect an increase in braking effort, holding valves 21 will immediately open. This, of course, means that some air will escape from the brake cylinders during the time required for the system to reduce brake pipe pressure sufficiently to cause control valves 3 and 5 to shift out of release position. If this condition is considered intolerable, it can be eliminated by designing cam 11 so that it closes switch 9 in the application positions of handle 8 as well as in the holding position.

Although, as mentioned earlier, the illustrated system is the preferred embodiment of the invention, many changes can be made in this scheme without departing from the inventive concept. For example, several brake valve means different from the Type 26 equipment may be employed to charge and exhaust brake pipe 1 from the head end of the train. Also, the switches 9 and 36 of the electrical supply circuits could be operated manually or by devices independent of the brake valve. Finally, I might mention that the constituent portions of trainlined control wire 17 may be joined by jumpers or other connectors entirely separate from brake pipe 1 and its couplings 16.

I claim:

1. An electropneumatic braking system for trains including:
   a. a trainlined brake pipe 1;
   b. brake valve means 2, 14 for charging and exhausting the brake pipe;
   c. control valve mean means 3 or 5 on each car in the train serving to vary the pressure in a brake cylinder 4 or 6 in response to changes in brake pipe pressure by admitting air to the brake cylinder from a reservoir 7 or exhausting air from the brake cylinder to atmosphere through an exhaust path 25;
   d. an electrical circuit comprising a trainlined control wire 17, and a return conductor 18 including metal portions of the cars;
   e. first supply means 31, 34, 35, 36 for electrically energizing the control wire 17 in one sense;
   f. application means 19, 19, 23, 24 on each car responsive to energization of the control wire 17 in said one sense for allowing escape of air from the brake pipe 1;
   g. second supply means 9, 31, 32, 33 for electrically energizing the control wire 17 in an opposite sense; and
   h. holding means 21, 21a, 26, 27 on each car responsive to energization of the control wire 17 in said opposite sense for preventing escape of air from the brake cylinder 4 or 6 through said exhaust path 25.

2. A braking system as defined in claim 1 in which:
   a. the trainlined brake pipe 1 consists of constituent portions 1a, 1b carried on the cars and interconnected by electrically nonconductive hoses 15 and metal couplings 16; and
   b. the trainlined control wire 17 consists of constituent portions 17a, 17b carried by the cars and interconnected through said hose couplings 16.

3. A braking system as defined in claim 1 in which
   a. the brake valve means 2, 14 includes:
      1. an equalizing reservoir 14,
      2. brake control means 8 settable to at least release and holding positions in each of which it effects charging of the equalizing reservoir, and an application position in which it effects a reduction in equalizing reservoir pressure, and
      3. relay valve means 12, 13 which responds to equalizing reservoir pressure and is adapted to establish and maintain a corresponding pressure in the brake pipe, the relay valve means serving to exhaust air from the brake pipe only when brake pipe pressure exceeds equalizing reservoir pressure by a predetermined amount;
   b. the first supply means 31, 34 35, 36 automatically energizes the control wire 17 when brake pipe pressure exceeds equalizing reservoir pressure by an amount less than said predetermined amount; and
   c. the second supply means 9, 31, 32, 33 automatically energizes the control wire 17 when the brake control means 8 is set to holding position.

4. A braking system as defined in claim 3 in which the second supply means 9, 31, 32, 33 energizes the control wire 17 only when the brake control means 8 is set in holding position.

5. A braking system as defined in claim 3 in which
   a. the first supply means comprises:
      1. a source of AC 31,
      2. a conductor 34 connecting the source with the electrical circuit 17, 18 through a blocking diode 35 and an application switch 36, and
      3. motor means 37 responsive to differences between brake pipe and equalizing reservoir pressures for operating the application switch; and
   b. the second supply means comprises
      1. said AC source 31, and
      2. a second conductor 32 connecting the source with the electrical circuit 17, 18 through a second switch 9 which is operated by the brake control means 8, and a second blocking diode 33,
   c. one blocking diode permitting current flow from the control wire 17 to the return conductor 18 and the other permitting current flow in the opposite direction.

6. A braking system as defined in claim 5 in which
   a. the application means comprises:
      1. a vent connection 22 leading from the brake pipe 1 to the atmosphere and controlled by a solenoid operated, normally closed shutoff valve 19; and
      2. a branch conductor 23 connecting the solenoid 19a of the shutoff valve 19 across the electrical circuit and containing a blocking diode 24;
   b. the holding means comprises:
      1. a solenoid operated, normally open vent valve 21 controlling said exhaust path 25; and
      2. a second branch conductor 26 connecting the solenoid 21a of the vent valve across the electrical circuit and containing a second blocking diode 27.

7. A braking system as defined in claim 6 in which
   a. the trainlined brake pipe 1 consists of constituent portions 1a, 1b carried on the cars and interconnected by electrically nonconductive hoses 15 and metal couplings 16; and
   b. the trainlined control wire 17 consists of constituent portions 17a, 17b carried by the cars and interconnected through said hose couplings 16.

8. Electropneumatic braking apparatus for a railway car comprising
   a. a brake pipe 1a or 1b extending through the car from end to end;
   b. an electrical circuit comprising a control wire 17a or 17b extending through the car from end to end, and a return conductor 18 including metal portions of the car;
   c. control valve means 3 or 5 for varying the pressure in a brake cylinder 4 or 6 in response to changes in brake pipe pressure by admitting air to the brake cylinder from a reservoir 7 or exhausting air from the brake cylinder to atmosphere through an exhaust path 25;
   d. application means 19, 19a, 23, 24 responsive to energization of the control wire in one sense for allowing escape of air from the brake pipe; and
   e. holding means 21, 21a, 26, 27 responsive to energization of the control wire in an opposite sense for preventing escape of air from the brake cylinder through said exhaust path 25.

9. Braking apparatus as defined in claim 8 in which
   a. each end of the brake pipe 1a or 1b joins an electrically nonconductive hose 15 having a free end to which is attached a metal hose-coupling half 16; and
   b. the ends of the control wire are connected to the coupling halves at the ends of the brake pipe.

10. Braking apparatus as defined in claim 8 in which:
    a. the application means comprises:
       1. a vent connection 22 leading from the brake pipe 1a or 1b to the atmosphere and controlled by a solenoid operated, normally closed shutoff valve 19, and
       2. a branch conductor 23 connecting the solenoid 19a of the shutoff valve 19 across the electrical circuit and containing a blocking diode 24; and
    b. the holding means comprises
       1. a solenoid operated, normally open vent valve 21 controlling said exhaust path 25, and
       2. a second branch conductor 26 connecting the solenoid 21a of the vent valve across the electrical circuit and containing a second blocking diode 27.